Patented Nov. 18, 1947

2,431,038

UNITED STATES PATENT OFFICE 2,431,038

TIN HYDROCARBON COMPOUNDS AND PROCESS FOR MAKING SAME

James O. Harris, Anniston, Ala., assignor to Monsanto Chemical Company, St. Louis, Mo., a corporation of Delaware No Drawing. Application July 24, 1944, Serial No. 546,443

21 Claims. (Cl. 260—429)

The present invention relates to the production of tin hydrocarbon compounds, particularly tetraphenyl tin, and to an improved process for preparing same.

An object of the invention is to provide an economical and commercially feasible process for making tetraphenyl tin.

Another object is to provide a process for making tetraphenyl tin which does not require close temperature control to avoid destroying the reaction mixture and also to prevent the development of side reactions which are responsible for the low product yields of some of the prior processes.

A further object is to provide a relatively safe process for making tetraphenyl tin which eliminates many of the manipulative steps and reagents of the prior art.

Other objects and advantages of the present invention will be apparent to those skilled in the art as the description proceeds.

Heretofore, several processes have been proposed for the manufacture of tetraphenyl tin and while they have been very satisfactory for laboratory use, they have not been adopted, so far as applicant is aware, on a technical scale. The reason for this will be obvious from the considerations which immediately follow.

It is known, for example, that tetraphenyl tin can be prepared by refluxing bromobenzene with about 4 times the calculated amount of a 14% sodium-tin alloy, followed by extraction with cold and then with boiling carbon tetrachloride. This process, however, is objectionable because it involves the use of an alloy, not commercially available, which is difficult and expensive to prepare. In addition, to this, such a process results in low product yields.

A second process using the Grignard reaction has also been suggested, but it is subject to the disadvantage that it requires the use of expensive reagents including a highly volatile and inflammable solvent which renders the process an exceedingly hazardous operation when carried out on a large scale. Moreover, this is an essentially two step process which requires very accurate temperature control to obviate spoilage of the entire batch and also the development of side reactions. It is, therefore, readily apparent why this process has not been adopted commercially.

It has also been proposed to prepare tetraphenyl tin by the so-called zinc diphenyl method. According to this method phenyl magnesium bromide is prepared in the usual way in a 3-necked boiling flask, provided with a reflux condenser fitted with a calcium chloride tube, a dropping funnel and a tube through which a current of nitrogen can be introduced. On completion of the reaction a suspension of dry zinc chloride in absolute ether is added through the dropping funnel. Reaction takes place immediately. Toluene is then added and the ether distilled on a water bath. To the cooled solution is added a solution of an equivalent amount of stannic chloride in toluene and the mixture boiled for one hour. All of these manipulations are carried out in an atmosphere of nitrogen. After cooling, dilute hydrochloric acid is added and the solution filtered. The residue is extracted with boiling benzene. The toluene layer of the filtrate is united with the benzene extracts and the mixture concentrated and cooled. A very high product yield (about 91.2% of theory) is thus obtainable but in view of the numerous manipulative steps involved and also the disadvantages inherent in the use of the Grignard reagent, this process is clearly not adapted for use on a technical scale.

Now I have developed a relatively simple, commercially feasible process for making tetraphenyl tin which apparently has none of the objectionable features enumerated above. This process involves the reaction of tin tetrachloride with a monohalogenated benzene in the presence of an inert organic solvent containing metallic sodium, the reaction proceeding in accordance with the following equation:

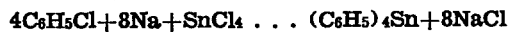

$$4C_6H_5Cl + 8Na + SnCl_4 \ldots (C_6H_5)_4Sn + 8NaCl$$

In the practice of my process an inert organic solvent is charged into a suitable reactor which is equipped with a reflux condenser, agitator and a heat exchanger for controlling the temperature in the reactor. Metallic sodium, preferably in the form of sodium wire, is introduced into the solvent and the charge is heated to boiling, whereupon a monohalogenated benzene containing stannic chloride is gradually added with stirring until a sufficient amount of heat is developed exothermically to sustain the reaction. The application of external heat is then discontinued and the reaction mixture is allowed to reflux gently until the charge ceases to boil, the reflux rate being controlled by regulating the rate of flow of the halogenated benzene solution. External heat is reapplied until the reaction goes to completion and then the reaction product is treated with filter aid and filtered. The filter cake is discarded or reworked by recycling it to the reactor and the filtrate is cooled to crystallize out the dissolved tin tetraphenyl which is filtered and dried in any suitable manner. The inert solvent separated by this filtration step may, if desired, be distilled or otherwise treated to render it suitable for recycling to the reactor for use in the production of additional quantities of tetraphenyl tin.

My invention is illustrated but not limited by the following examples:

Example I 527 grams of dry benzene and 41 grams of metallic sodium wire were introduced into a reactor equipped with a reflux condenser, agitator and a heat exchanger for heating and cooling the charge. The charge was then heated to boiling (about 80° C.) and a solution of 61 grams of stannic chloride in 133 grams of monochlorobenzene was gradually added thereto with stirring. During this operation the reflux rate was controlled by external heating until about one-fifth of the solution had been fed into the reactor, whereupon external heating was discontinued and the exothermic heat developed was permitted to maintain the reaction mixture at a steady reflux. This was accomplished by regulating the flow of the chlorobenzene solution of stannic chloride into the reactor. After all of the solution had been introduced into the reactor, the refluxing was continued until the exothermic heat developed was insufficient to reflux the charge, whereupon external heat was applied and the reaction mixture refluxed for about two hours.

At the end of this procedure, filter aid was added to the reactor and the reaction product was filtered. The precipitate including salt, tetraphenyl tin, etc., retained by the filter was returned to the reactor and the filtrate was cooled to precipitate the dissolved tetraphenyl tin which was then filtered off and dried. The filtrate from the latter operation was returned to the reactor where, after thorough mixing with the filter cake and heating, the product was filtered and the filtrate cooled to precipitate out additional quantities of tetraphenyl tin. This procedure was repeated twice in order to extract the remaining tetraphenyl tin and to increase still further the yield of the final product.

The final filtrate was distilled until a vapor temperature of 85–90° C. was attained, after which the distilled liquid consisting principally of benzene was recycled for use in the preparation of additional quantities of tetraphenyl tin. The residue was cooled to precipitate out additional quantities of tetraphenyl tin which was recovered by filtration.

66.5 grams of tetraphenyl tin as recovered in the above operations, giving a product yield of 66.5% of theory, basis stannic chloride.

Example II

The procedure employed in Example I was repeated using 2109 grams of benzene, 164 grams of metallic sodium, 244 grams of stannic chloride and 704 grams of monobromobenzene. 213 grams of tetraphenyl tin was obtained which represents a product yield of 53.25% of theory, basis stannic chloride.

The present process for making tetraphenyl tin is preferably carried out at a temperature of about 80° C., but satisfactory results are also obtainable at a temperature substantially in the range of from about 55° C. to a temperature just below the melting point of sodium. When operating within the lower limits of this temperature range, a heat exchanger or other cooling device is necessary in order to control the temperature of the reaction.

The preferred operating temperature for producing other tin hydrocarbon compounds varies with the particular tin compound being produced.

To obtain the optimum results in the production of tetraphenyl tin and tin hydrocarbon compounds in general, it is desirable (although not absolutely essential) to conduct the reaction in the substantial absence of oxygen and moisture. Hence prior to initiating the reaction, the reagents should be substantially dry and the air in the reactor should be displaced by vaporizing a portion of the inert organic solvent or by the introduction of an inert gas such as nitrogen.

In the manufacture of tetraphenyl tin I preferably carry out the reaction in the presence of benzene, but other inert organic solvents such as toluene, hexahydrobenzene, ligroin, petroleum ether, etc., or mixtures thereof may also be employed.

It is desirable to use a sufficient amount of one or more of the above solvents to dissolve all or substantially all of the tetraphenyl tin formed in the reaction as by operating in this manner the product yield is substantially increased and the formation of impurities is reduced to a minimum. However, it should be clearly understood that it is within the scope of my invention to use larger or smaller quantities of solvent if desired.

The same considerations apply in the production of other tin hydrocarbons, it being understood, of course, that the most satisfactory solvent for use in a given reaction will depend upon the tin hydrocarbon being produced.

The inert organic solvent plays an important role in my process since it absorbs the exothermic heat developed in the reaction and transfers it, during the refluxing operation, to the heat exchanging medium employed in the condenser. This eliminates the necessity for close temperature control by external means such as heat exchangers, cooling coils and similar devices which must be applied directly to the reactor to obtain the desired result. In addition thereto, the use of an inert solvent prevents the development of side reactions which lead to the production of impurities in the product. Also, since the reagents are not consumed in the production of impurities, the yield of the product is materially increased.

The optimum amount of monohalogenated hydrocarbon which should be employed varies with the tin hydrocarbon compound being prepared, but in general I use more than the theoretical amount as I thereby obtain the most satisfactory product yields.

In the production of tetraphenyl tin, I have found that the best results from the standpoint of product yield are obtained when a 20% molar excess of monochloro or monobromobenzene is used. However, larger or smaller quantities of these compounds may be employed if desired.

In the production of tin hydrocarbon compounds, particularly tetraphenyl tin, I may add to the reaction mixture up to 10% excess (or more) of the theoretical amount of metallic sodium. However, I prefer to use about 95% of the theoretical amount as thereby I avoid, without substantially decreasing the yield of the product, the necessity for subsequently eliminating the unreacted sodium.

So long as the theoretical requirements are complied with, the quantity of stannic or stannous halide used does not appear to be critical.

The above description has been limited primarily to the production of tetraphenyl tin, but it should be understood that other tin hydrocarbon compounds such as tin tetra-o-tolyl, tin tetra-p-tolyl, tin diphenyl, tin tetra-ethyl, tin-tetra propyl, etc. may be prepared by this method, the reaction in each instance proceeding in accordance with the following general equations:

$$4RX + 8Na + SnX_4 \ldots R_4Sn + 8NaX$$
$$2RX + 4Na + SnX_2 \ldots R_2Sn + 4NaX$$

where R is a hydrocarbon radical and X is a halogen atom, preferably chlorine and bromine.

While I have described above certain specific forms of my invention, it will be appreciated that it is susceptible to various changes and modifications without departing from the spirit thereof.

What I claim is:

1. The process for making tin hydrocarbon compounds which comprises reacting together a monohalogenated hydrocarbon, a tin halide and metallic sodium in the presence of an inert organic solvent, said reaction being carried out at a temperature of from about 55° C. up to a point just short of the melting temperature of sodium.

2. The process for making tin hydrocarbon compounds which comprises reacting together a monohalogenated hydrocarbon, a tin halide and metallic sodium in the presence of an inert organic solvent, said reaction being carried out in the substantial absence of oxygen and at a temperature of from about 55° C. up to a point just short of the melting temperature of sodium.

3. The process for making tin hydrocarbon compounds which comprises reacting together a monohalogenated hydrocarbon, a tin halide and metallic sodium in the presence of an inert organic solvent, said reaction being carried out in the substantial absence of moisture and at a temperature of from about 55° C. up to a point just short of the melting temperature of sodium.

4. The process for making tin hydrocarbon compounds which comprises reacting together a monohalogenated hydrocarbon, a tin tetrahalide and metallic sodium in the presence of an inert organic solvent and at a temperature of from about 55° C. up to a point just short of the melting temperature of sodium.

5. The process for making tetraphenyl tin which comprises reacting together a monohalogenated benzene, a tin tetrahalide and metallic sodium in the presence of an inert organic solvent, said reaction being carried out at a temperature of from about 55° C. up to a point just short of the melting temperature of sodium.

6. The process for making diphenyl tin which comprises reacting together a monohalogenated benzene, stannous chloride and metallic sodium in the presence of an inert organic solvent, said reaction being carried out at a temperature of from about 55° C. up to a point just short of the melting temperature of sodium.

7. The process for making tetraphenyl tin which comprises reacting together monochlorobenzene, a stannic halide and metallic sodium in the presence of an inert organic solvent, said reaction being carried out at a temperature of from about 55° C. up to a point just short of the melting temperature of sodium.

8. The process for making tetraphenyl tin which comprises reacting together monobromobenzene, a stannic halide and metallic sodium in the presence of an inert organic solvent, said reaction being carried out at a temperature of from about 55° C. up to a point just short of the melting temperature of sodium.

9. The process for making tetraphenyl tin which comprises reacting together monochlorobenzene, stannic chloride and metallic sodium in the presence of benzene, said reaction being carried out at a temperature of from about 55° C. up to a point just short of the melting temperature of sodium.

10. The process for making tetraphenyl tin which comprises reacting together monochlorobenzene, stannic chloride and metallic sodium at a temperature substantially in the range of from about 55° C. to a point just short of the melting temperature of sodium, said reaction being carried out in the presence of benzene.

11. The process for making tetraphenyl tin which comprises reacting together monochlorobenzene, stannic chloride and metallic sodium at a temperature of about 80° C., said reaction being carried out in the presence of an inert organic solvent.

12. The process for making tetraphenyl tin which comprises reacting together monochlorobenzene, stannic chloride and metallic sodium at a temperature of about 80° C., said reaction being carried out in the presence of benzene in the substantial absence of oxygen.

13. The process for making tetraphenyl tin which comprises reacting together monochlorobenzene, stannic chloride and metallic sodium in the presence of a sufficient amount of an inert organic solvent to dissolve substantially all of the tetraphenyl tin produced, said reaction being carried out at a temperature of about 80° C.

14. The process for making tetraphenyl tin which comprises reacting together monochlorobenzene, stannic chloride and metallic sodium in the presence of an inert organic solvent and at a temperature of about 80° C., said sodium being employed in an amount exceeding the theoretical requirements for this reaction.

15. The process for making tetraphenyl tin which comprises reacting together a 20% molar excess of monochlorobenzene, stannic chloride and metallic sodium in the presence of an inert organic solvent, said reaction being carried out at a temperature of from about 55° C. up to a point just short of the melting temperature of sodium.

16. The process for making tetraphenyl tin which comprises reacting together monochlorobenzene, stannic chloride and about 95% of the theoretical amount of metallic sodium required for this reaction, said reaction being carried out in the presence of an inert organic solvent and at a temperature of about 80° C.

17. The process for making tetraphenyl tin which comprises reacting together monochlorobenzene, stannic chloride and metallic sodium in the presence of a sufficient amount of an inert organic solvent to dissolve the tetraphenyl tin produced, filtering the reaction product and then recovering the tetraphenyl tin, said reaction being carried out at a temperature of from about 55° C. up to a point just short of the melting temperature of sodium.

18. The process for making tetraphenyl tin which comprises refluxing a reaction mixture comprising a monohalogenated benzene, a stannic halide and metallic sodium wire at a temperature of about 80° C. in the presence of a sufficient amount of an inert organic solvent to dissolve the tetraphenyl tin produced, filtering the reaction product, cooling the filtrate and then recovering the precipitated product.

19. The process for making tetraphenyl tin which comprises refluxing monochlorobenzene, stannic chloride and metallic sodium wire at a temperature of about 80° C. in the presence of a sufficient amount of benzene to dissolve the tetraphenyl tin produced, filtering the reaction product, cooling the filtrate and then recovering the precipitated product.

20. The process for making tetraphenyl tin which comprises introducing a monochlorobenzene solution of stannic chloride into a boiling mixture of an inert organic solvent and sodium, refluxing the resulting mixture until the reaction has gone substantially to completion and then recovering the tetraphenyl tin produced, said reactants being employed in substantially the theoretical proportions required to produce tetraphenyl tin.

21. The process for making tetraphenyl tin which comprises introducing a monochlorobenzene solution of stannic chloride into a boiling mixture of benzene and sodium wire, refluxing the resulting mixture until the reaction has gone to completion, precipitating the tetraphenyl tin thus produced by cooling and then separating the precipitate, said reactants being employed in substantially the theoretical proportions required to produce tetraphenyl tin.

JAMES O. HARRIS.

REFERENCES CITED

The following references are of record in the file of this patent:

Polis, "Ber. Deut. Chem.," vol. 22 (1889), p. 2916.

Hale, "The Synthetic Use of Metals in Organic Chemistry," 1914, pp. 18 and 19.

Polis, "Ber. Deut. Chem.," vol. 19 (1886), pp. 1012 to 1013, 1014 and 1015.